United States Patent [19]
Perdue

[11] 3,835,618
[45] Sept. 17, 1974

[54] APPARATUS FOR PRODUCING VACUUM SKIN PACKAGES IN MULTIPLES

[75] Inventor: Richard Russell Perdue, Greer, S.C.
[73] Assignee: W. R. Grace & Co., Duncan, S.C.
[22] Filed: Jan. 22, 1973
[21] Appl. No.: 325,295

[52] U.S. Cl. .................................. 53/112 A, 53/86
[51] Int. Cl. ............................................ B65b 31/02
[58] Field of Search.................... 53/22 A, 86, 112 A

[56] References Cited
UNITED STATES PATENTS
3,545,163   12/1970   Mahaffy et al. ...................... 53/22 A
3,694,991   10/1972   Perdue et al. ........................ 53/22 A

*Primary Examiner*—Travis S. McGhee
*Attorney, Agent, or Firm*—John J. Toney; William D. Lee, Jr.

[57] ABSTRACT

Thermoplastic film is drawn by differential air pressure against a multiplicity of concave interior surfaces of the upper portion of a vacuum chamber; the film is then heated by surface contact; then, after evacuation of the chamber in which has been placed a multiplicity of products spaced upon a backing board, differential air pressure is used to blow the film down over each of the products and against the backing board completely around each of the products thereby sealing the film to the board; and, subsequently, the board and film are cut to provide a multiplicity of individually sealed, vacuum skin packages. By this method and apparatus the prior art problem of "draping" and "webbing", i.e., the failure of the film to contact the board or seal to itself between relatively tall, adjacent products, is eliminated.

4 Claims, 12 Drawing Figures

APPARATUS FOR PRODUCING VACUUM SKIN PACKAGES IN MULTIPLES

FIELD OF THE INVENTION

This invention relates generally to skin packaging and specifically to vacuum skin packaging of a plurality of both food and nonfood items in a single vacuum chamber. In particular, the present invention represents an improvement over the process disclosed in U.S. Pat. No. 3,694,991 issued on Oct. 3, 1972.

The term "vacuum" as used herein means a differential fluid pressure where the fluid can be either a gas or a liquid.

BACKGROUND OF THE INVENTION

Skin packaging is essentially a or film 1 In a typical process, a sheet of thermoplastic film is placed in a frame, a vacuum plate upon which a piece of backing board is placed. The product to be skin packaged is positioned on top of the backing board and heat is applied to the thermoplastic film in the frame. When the film has been heated to become sufficiently soft, the frame is lowered and the plastic sheet drapes itself over the product. As this happens, a partial vacuum is created through the vacuum plate and the air underneath the plastic film is withdrawn through the backing board. The air pressure differential between the top and the bottom of the plastic sheet causes the sheet to be tightly pressed around the product. The film may be coated with an adhesive or the backing board may be so coated. Where the two contact each other, a strong bond is formed resulting in a package in which the product is tightly held to the backing board for safe shipping and for subsequent rack display in retail stores.

Vacuum skin packaging differs from the above described skin packaging process in that both the thermoplastic film and the backing board are impervious to gases and the resulting package can be evacuated and hermetically sealed, if desired. The same end result is sought, i.e., the product is to be tightly held by the transparent film to the backing board. The conventional method employs a backing board which is porous or which is perforated so that the vacuum may be drawn directly through the backing board. The vacuum skin packaging processes generally employ a vacuum chamber with an open top. The product on an impervious backing board is placed on a platform within the vacuum chamber. The top of the chamber is then covered by a sheet of film which is clamped tightly against the chamber to form a vacuum type closure. The chamber is evacuated while the film is heated to forming and softening temperatures. The platform can then be raised to drive the product into the softened film and air pressure can be used above the film to force it tightly around the product. This type of process is disclosed in French Pat. No. 1,258,357 issued to Alain G. Bresson on Mar. 6, 1961.

A refinement to the process described in the Bresson French Patent is disclosed in French Pat. No. 1,286,018 issued on Jan. 22, 1962 to Laroch Freres, Limited. In the Laroch Freres process, after the chamber has been evacuated and the product driven into the heat softened film, the vacuum is released and ambient air is permitted to enter the chamber so that the thermoplastic film molds more or less on the product since there is a vacuum on the product side of the film and ambient air pressure on the other side of the film.

In Australian Pat. No. 245,774 issued to Colbro Proprietary Limited and Cole and Son proprietary Limited on July 16, 1963, a vacuum skin packaging process is described in which an article to be packaged is inserted within the lower half of a vacuum chamber on a backing board, a thermoplastic film is placed over the open face of the lower half of the chamber, the chamber is closed and both halves are brought to essentially the same state of vacuum, the film heated and softened, and then atmospheric air is introduced into the upper half of the chamber so that it alone forces the thermoplastic film down around the product and against the backing board.

Still another variation which can be found in the prior art, is that disclosed in U.S. Pat. No. 3,491,504 issued to W. E. Young et al. on Jan. 27, 1970. The Young patent discloses a process in which the softened film can be physically moved down over a stationary product and, in combination with air pressure, the softened thermoplastic film will be molded onto the product.

In all of the above described prior art processes, the thermoplastic film is stretched across the open face of a vacuum chamber. The product is then either driven up into the film, the film pulled down over the product, or air pressure is used to move the film. Having to physically move the film or the product slows down the packaging process and, in addition, requires that the product be strong enough to withstand the force of contacting the film. Furthermore, when the film is stretched flat and straight across the vacuum chamber, excess film is required and wrinkling of the film may occur due to unnecessary movement of the film.

Still another drawback to prior art process is that when more than one product is placed on a backing board to be packaged, "draping" and "webbing" occurs wherein the film between adjacent products does not contact the backing board or seals to itself before contacting the board thereby either failing to separate the products and provide individual, closed packages for each product or by sealing to itself and providing a thick doubled "web" of material which is difficult to cut through and which can contain passageways which permit air to enter the package. This is a particular problem in packaging relatively tall products or objects. Thus, prior art processes are generally limited to packaging one product in each vacuum chamber making the production of packages rather slow or to spacing the packages farapart thus wasting film and board. These disadvantages are overcome and many advantages are provided by the invention described hereinbelow.

SUMMARY OF THE INVENTION

In its broadest aspect of the present invention is a method of vacuum skin packaging a plurality of objects spaced on an impervious backing board in individual packages within a single vacuum chamber. The steps of the method include placing said objects on said backing board in a spaced array; shaping a relatively gas impervious thermoplastic film into a plurality of cavities within a vacuum chamber; maintaining said shaped cavities in said film; positioning said cavities over said spaced objects, each cavity covering one object and there being a cavity wall between each object, the lower extremity of said wall being spaced from said backing board to allow free passage of air or gas from cavity to cavity; evacuating said chamber whereby each cavity is evacuated; and, moving said film from its concave shapes by differential air pressure so that said film closely contacts each product and the backing board immediately around the product to form an individual skin package for each product or object. The film may be heated and the backing board may be adhesively compatible with the film so that sealing will occur without an adhesive coating; or, a coating of heat activatable or other adhesive may be applied to either the surface of the film or the board. After sealing, the board and film are severed to form individual packages.

In a narrower aspect, the process of the present invention comprises placing the products to be packaged on a gas impervious supporting member; shaping a flexible sheet member into a multiplicity of concavities; maintaining the concavities in the sheet; positioning said sheet over each of said products and the supporting member so that said sheet partially covers but does not contact either the products or supporting member; evacuating the space between said sheet and said supporting member; moving said sheet from its concave shapes and position so that it closely contacts said products and supporting member; and sealing the supporting member to the sheet member around each product. In even more limited aspects, the present process includes the use of a flexible sheet member which is made from a formable thermoplastic film and includes heating the thermoplastic film to its forming temperature when it is in the concave shapes. The film, of course could be preheated to its forming temperature before being shaped into the cavities and this requires that the film be maintained at its forming temperature until it is moved against the product and supporting member. A preferred method of shaping and moving the thermoplastic film is to use differential air pressure. Also, the invention includes the step of cutting the film and board between products to provide a multiplicity of individually sealed, vacuum skin packages.

The apparatus which constitutes a part of the present invention will perform the above-described process. In particular, the apparatus comprises a vacuum chamber having an open top; means for supporting objects to be packaged within said chamber; means for evacuating the chamber; and closure means for the chamber which comprises a plurality of concave inner surfaces, a means for creating differential air pressure on the concave surface and means for heating the surface. A means for adjusting the height of the chamber for differing product heights is also included.

The process and apparatus of the present invention may be better understood by reference to the following detailed description and drawings.

DESCRIPTION OF THE DRAWINGS

In the drawings which form a part of this specification.

DESCRIPTION IN DETAIL

Figure 1:
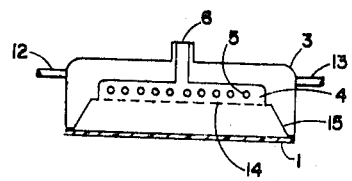
FIG. 1 is a schematic representation of a section through the closure means for a vacuum chamber showing a flexible packaging sheet member across the opening of the cavity in said closure means.
Figure 1A:
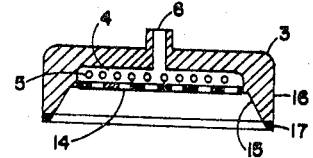
FIG. 1A is a sectional view of the closure means of FIG. 1 showing the arrangement of the heating elements, vacuum ports, and height adjusting means for the closure means.

Referring first to FIG. 1, a schematic sectional view of upper vacuum head 3 is shown. Vacuum head 3 serves as the closure means for the vacuum chamber described hereinbelow. The detail of the vacuum head 3 can best be appreciated by viewing both FIGS. 1 and 1A. In these figures it can be seen that inwardly sloping wall 15 and the horizontal wall portion containing ports 14 define a concave space or cavity within the vacuum head 3. Above the ports 14 is manifold space 4 having an exterior port 6. Heating elements 5 are placed within the manifold area for heating the wall containing the ports 14. These heating elements may either be steam lines with inlet 12 and outlet 13 feeding steam to elements 5; or, the elements may be electrically operated radiant heaters or resistance type heaters.

Vacuum head 3 has a vertical peripheral wall or leg 16 to which can be added a shim member 17 to extend or shorten the height of wall 16. The shim 17 conforms to the shape of the opening of the cavity in the vacuum head 3 and makes it possible to adjust the height of the head for different product sizes.

Figure 2:
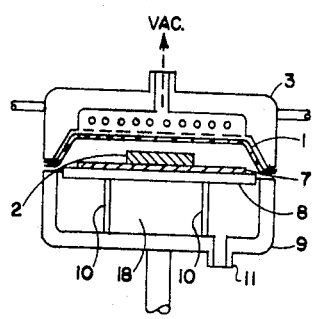
FIG. 2 is a schematic representation of a vacuum chamber and closure means with a sheet member formed into a concave shape and the product and supporting member in place within the chamber.

Turning now to FIG. 2, vacuum chamber 9 can be seen having platform 8 placed therein which is carried by platform supports 10. In position on the platform 8 is backing board or package supporting member 7 upon which has been placed the product 2 which is to be packaged. Flexible packaging film 1 is shown lining the cavity of the closure means 3. Chamber 9 has a manifold or cavity region 18 which has an exterior port 11 and which has a passageway to the head cavity which is defined by the space between chamber 9 and platform 8.

Returning now to FIG. 1 to describe the method of the present invention, a sheet of flexible packaging material 1 is shown stretched across the opening to the cavity in head 3. In most packaging applications, it is preferred that the sheet material 1 be transparent. Particularly suitable packaging materials are the thermoplastics such as polyethylene, cross-linked polyethylene, polypropylene, saran, nylon, polyvinylchloride, or the like and laminates of any of these materials. When thermoplastic materials are used, they will be relatively stiff or semi-rigid before being heated to a softened and formable stage. The present invention contemplates the use of such heat softenable thermoplastic materials and when such materials are placed across the opening to the cavity of head 3 as shown in FIG. 1, they may be either preheated to partially soften them, or they may be heated to softening temperatures by the radiant, conductive, and convective action of heaters 5.

After positioning the packaging material 2 2 as shown in FIG. 2, a pressure differential or vacuum is applied 25 2, 2 pressure differential or as shown in FIG. 2 by the arrow and the abbreviation "vac." This pressure differential, or vacuum, acts through ports 14, through manifold region 4, and through the exhaust ports 6. Any conventional vacuum pump can be used to apply this pressure differential. Upon the application of the pressure differential, the film 1 will assume the shape shown in FIG. 2. In this shape, the film 1 lines the cavity of the head 3 and is formed in the same concave shape as the cavity in the head. That is, a cavity is formed in the film 1 at this point.

Still referring to FIG. 2, it can be seen that product 2 has already been placed upon supporting member 7 which, in turn, has been placed upon platform 8. The supporting member 7 is preferably a gas impervious material and may be a metal such as aluminum sheet or foil; a plastic material such as polystyrene foam; a laminate of paperboard with a gas impervious plastic coating; or, in general, any sheet-like clear or opaque material.

Figure 3:
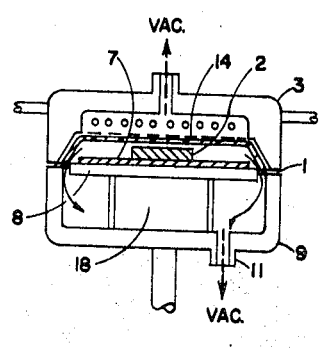
FIG. 3 is a schematic representation of the evacuation of the space between the sheet member and the supporting member.

As shown in FIG. 2, the film 1 shaped into a concave form or cavity has been positioned over the product 2 and supporting member 7. At this point the vacuum head 3 has not been closed upon the chamber 9. The closing of the chamber is accomplished as shown in FIG. 3. During this whole sequence of operation as shown in FIGS. 2 and 3, vacuum is constantly applied through ports 14, manifold 4, and port 6 to retain the concave shape of the film 1. In FIG. 3, with the chamber closed by closure member or head 3, vacuum or pressure differential is applied through port 11 and the application of this vacuum is illustrated by the downwardly pointing arrow and the abbreviation "vac". Arrows on either side of platform 8 are used to demonstrate the evacuation of the air and gas from the region or space between supporting member 7 and film 1. The path of the evacuated gases or air is from the vicinity of product 2, around the peripheral space between chamber 9 and platform 8 into the chamber cavity or manifold 18, and out through port 11. As stated before, during the evacuation of the chamber, the concave shape of the film 1 is retained preferably by application of vacuum through ports 14 and manifold 4. During this process further heating can be supplied to soften the film 1 when it is a thermoplastic material.

Figure 4:
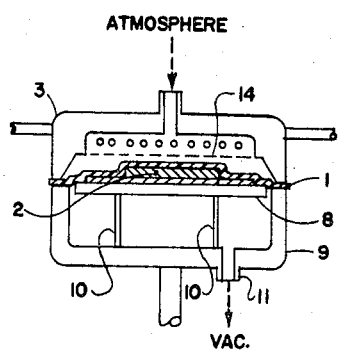
FIG. 4 is a schematic representation of the packaging sheet member after it has been moved against the product and into sealing engagement with the supporting member.

In FIG. 4, the film 1 is shown collapsed around and formed on product 2 and in contact with supporting member 7. The vacuum or pressure differential has been maintained through port 11 and the vacuum through port 6 has been released and atmospheric pressure has been admitted as shown by the downwardly pointing arrow from the word "atmosphere". Superatmospheric pressure can be applied through port 6 to move the film more rapidly and securely against product 2; or sub-atmospheric pressure could be applied to slow down the movement and stretching rate of the film. To move the film 1 against the product 2 and supporting member 7, it is only necessary that the pressure on the lower side of the film be less than the pressure on the upper side. For instance, in the step illustrated in FIG. 3, the vacuum applied on the upper side of film 1 through ports 14 must necessarily be equal to or greater than the vacuum applied below the film through port 11 in order to retain the concave shape of the film; but, when the film 1 is moved against the product 2 as shown in FIG. 4, the action of the vacuum acting through port 11 serves to pull the film against the product 2. Or, viewed in another manner, the action of the atmosphere pushes the film 1 down on the product 2.

To hold and retain the cavity or concave shape of the film 1 as shown in the steps illustrated in FIGS. 2 and 3, it is usually necessary to draw a vacuum in excess of 20 inches of mercury through ports 14; and, to ensure complete package evacuation, a vacuum in excess of 20 inches of mercury is usually applied through vacuum port 11. For best results, a vacuum of about 29 inches of mercury through both ports is preferred. As long as the vacuum applied above the film is greater than, or no less than, the vacuum applied below the film, the film will remain in place. However, when the vacuum is released above the film, it will move downward. When the film moves downwardly, it has to move only through a short distance before it contacts the top of the product 2. This short distance is occasioned by the concave shape of the film and gives the film little opportunity to wrinkle before contacting the product 2 and forming on it.

Figure 5:
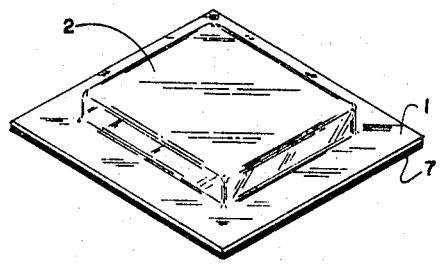
FIG. 5 is a schematic representation of an individual vacuum skin package.

A further advantage of shaping the film 1 into a cavity prior to forming it around the product is that the film 1 can be clamped at approximately the same level as the supporting member 7. (See FIG. 3) When the product 2 and supporting member 7 are located well below the opening to the vacuum chamber 9, the edges of the film 1 will be stretched disproportionately and will not adhere to the edges of the supporting member 1 without difficulty and excess, unusable film around the periphery of the supporting member 7 will result. Furthermore, in the present process, after being placed in the vacuum chamber the product and backing board remain stationary and do not have to be moved. This means that there is less likelihood of the product moving out of its position on the backing board 7 and less likelihood of the product 2 being distorted or even crushed by the physical movement of the product into the film. FIG. 5 shows a finished package made according to the present invention. Product 2, rectangular in shape, is covered by film 1 which closely conforms to the shape of the product. In other words, product 2 has served as the forming or die member for the film 1. The film is sealed against the supporting member 7 which carries product 2. Preferably, the packaging film 1 will be of an impervious material, that is, one having relatively low air or oxygen transmission and the same will be true for the supporting member 7. The sealing between film 1 and supporting member 7 can be accomplished in several different manners. For example, the film 1 can be coated with an adhesive which can be heat activatable. Thus, when the film is heated by contact with the wall 15 of the cavity of head 3 under the influence of heaters 5 (see FIG. 2), the adhesive will be activated and subsequently, when the film is moved against the backing board 7 as shown in FIG. 4, the adhesive will seal to supporting member 7. When polyethylene is used as the film 1, a coating of ethylene vinyl acetate makes a very satisfactory heat activatable adhesive. Another means of sealing is to coat the supporting member 7 with a material such as polyethylene which will be the same material used in the film 1. Thus, when sufficiently heated, the like materials will bond or seal one to the other. Still another method of sealing is to put pressure sensitive adhesive or heat activatable adhesive on the backing board and rely upon heat within the chamber to activate the adhesive.

PREFERRED EMBODIMENT

Figure 6:
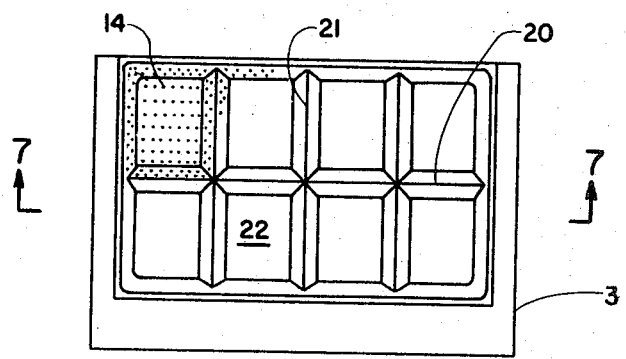
FIG. 6 is a view looking into a vacuum head showing the plurality of concave inner surfaces.

Referring now to FIG. 6, a view looking into the upper vacuum head 3, there is shown surface 22 with a plurality of cavities formed by longitudinal dividers 20 and transverse dividers 21. The cavities may be of any shape, size and number and the dividers be of any configuration to provide the desired shape and number of cavities, preferably V-shaped dividers as shown.

Figure 7:
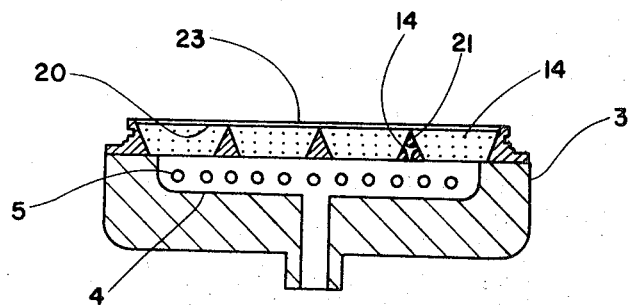
FIG. 7 is a view along line 7 — 7 of FIG. 6.

As illustrated in FIGS. 6 and 7, the concave surface 22 and the dividers 20 and 21 contain vacuum ports 14, which, for sake of convenience, are shown only in portions of thereof. It is to be understood that the ports exist throughout the surface and dividers.

Figure 8:
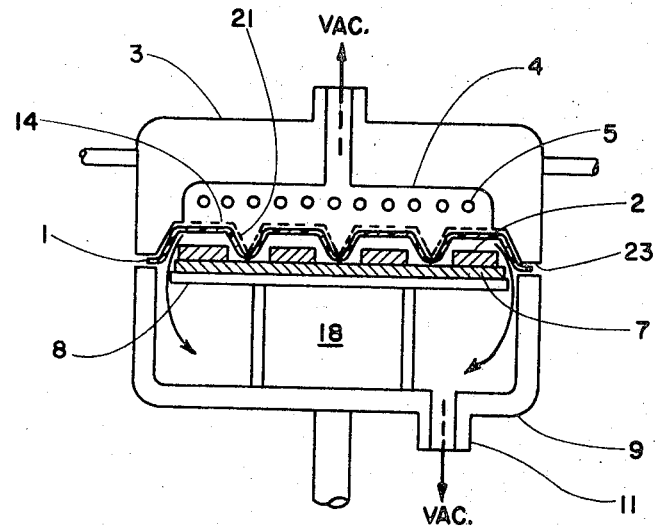
FIG. 8 is a schematic representation of a sectional side view showing the closed vacuum chamber with a plurality of products being vacuum skin packaged therein.

The materials and sequence of operation of the present invention are the same as heretofore described in detail; therefore, for the sake of brevity, the description will be to only those portions showing the improved method of simultaneously vacuum skin packaging a plurality of individual products. Turning now to FIG. 8, a schematic representation of a sectional side view showing the closed vacuum chamber 9 with a plurality of products 7 being vacuum skin packaged therein, a sheet of flexible packaging material 1 shaped into the cavities has been positioned over the products 2 which have been placed on a gas impervious supporting member 7 to permit the evacuation of gases from the spaces between the sheet and the supporting member. As can be seen in FIG. 8, rim 23 of the upper vacuum head 3 terminates the concave surface 22 and serves to seal the chamber; and, as can be seen in FIGS. 7 and 8, the height of the rim is greater than that of the dividers. The increased height permits and evacuation of gases from around the individual products and supporting member and permits the film to seal to the individual products and the supporting member surrounding each product.

Figure 9:
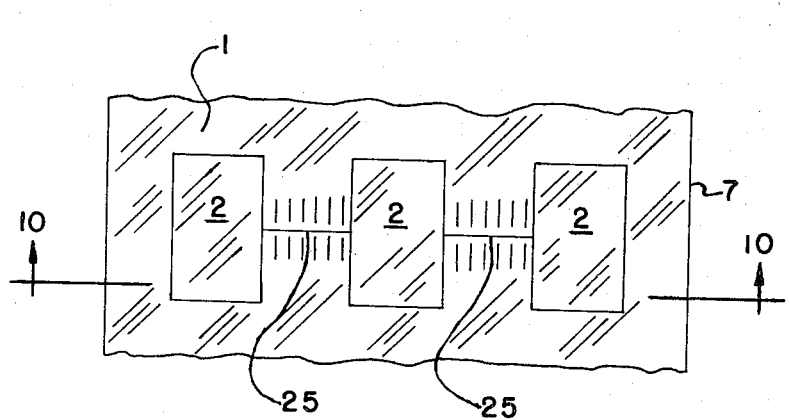
FIG. 9 is a top view of a partial section of a board having a plurality of objects vacuum skin packaged thereupon and showing the webbing which occurs between such packages made according to prior art processes.
Figure 10:
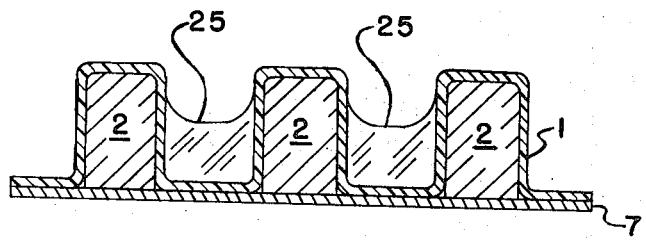
FIG. 10 is a view along line 10 — 10 of FIG. 9.
Figure 11:
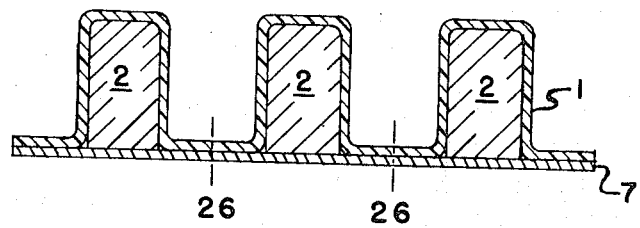
FIG. 11 shows the same objects of FIG. 9 packaged by the method and apparatus of the present invention.

If the prior art method of packaging is followed, the resulting package will have an appearance as shown in FIGS. 9 and 10. There, products 2 of moderate height have been placed on board 7 and vacuum skin packaged by film 1. The film 1 touches board 7 at the extreme right and left sides thereof and smoothly conforms to the shape of the products 2 on the extreme right and left of FIGS. 9 and 10, but between products 2 the film in prior art processes will adhere to itself before being drawn into contact with the board 7 by the action of the vacuum and will produce the web 25 which is a double layer of film adhered to itself. When this layer or web 25 is cut to separate the packages difficultly is encountered because the web 25 is not stretched tight like the remainder of the film and presents a flexible surface to cut. Furthermore, the film in adhering to itself does not always seal to itself in an airtight manner and passageways or channels are left through which air can enter each package after the packages have been separated. To overcome this in the prior art unusually large margins around the product had to be left. The present invention readily overcomes these prior art shortcomings and provides a package as shown in FIG. 11 where the film 1 closely conforms to the shape of the products 2, and the film in between adjacent packages contacts board 7 in a hermetic seal. The film and board may conveniently be severed along lines 26.

Any convenient means may be used to cut or sever the supporting member and film into individually sealed, vacuum skin packages after the sealing has been completed and the backing member 7 with the multiplicity of skin packaged products 2 has been removed from chamber 9, e.g., if eight cavities are provided as shown in FIG. 6 then one longitudinal and three transverse cuts would be needed to separate the backing member, film, and products into eight individual skin packages.

The present invention is particularly suitable in packaging food products in a high volume operation where an evacuated package is necessary to extend the shelf lifetime of the product. Various food items require packaging materials having differing moisture vapor transmission rates and oxygen permeability rates. Within the scope of this invention, packaging materials can be selected and used with properties that match the requirements for the particular packaged food item. Also, various atmospheres can be used for the product. For instance, the space containing the products can be flushed with an inert gas such as nitrogen and then a pressure differential applied to the film 1 through ports 14 to push it against the products 2 and backing member 7. Once sealed, hermetically closed packages result.

Having thus described my invention, I claim:

1. An apparatus for making vacuum skin packages comprising:
   a. a vacuum chamber having an open top;
   b. means for supporting objects to be packaged within said chamber;
   c. means for evacuating said chamber;
   d. closure means for said chamber, said closure means comprising
      i. a concave inner surface divided into a plurality of discrete cavities, said cavities being formed by a plurality of divider walls, and said inner surface terminating in a lower peripheral rim sealingly engagable with the periphery of said opening of the vacuum chamber to close and seal same from the atmosphere, the height of said rim being greater than that of said dividers whereby gases may be evacuated from each cavity within said sealed chamber,
      ii. means for creating differential air pressure in each cavity of said concave surface whereby a flexible sheet may be drawn thereagainst, and
      iii. means for heating said concave surface.

2. The apparatus of claim 1 wherein the means for creating differential air pressure in said cavities of said concave surface includes a plurality of vacuum ports in said surface, said ports opening into a common manifold.

3. The apparatus of claim 1 wherein the means for heating said surface are electric resistance heaters.

4. The apparatus of claim 1 wherein the means for supporting objects to be packaged is a platform whose upper surface is approximately on the same level with the open top of said vacuum chamber.

* * * * *